Feb. 21, 1961 T. P. RONA 2,972,737
INFORMATION TRANSFER AND STORAGE DEVICES
Filed Oct. 1, 1957 3 Sheets-Sheet 1

INVENTOR.
Thomas P. Rona
BY
Morse & Altman

Feb. 21, 1961 T. P. RONA 2,972,737

INFORMATION TRANSFER AND STORAGE DEVICES

Filed Oct. 1, 1957 3 Sheets-Sheet 2

INVENTOR.
Thomas P. Rona
BY
Morse & Altman

Feb. 21, 1961 T. P. RONA 2,972,737

INFORMATION TRANSFER AND STORAGE DEVICES

Filed Oct. 1, 1957 3 Sheets-Sheet 3

INVENTOR.
Thomas P. Rona
BY
Morse & Altman 2,972,737

INFORMATION TRANSFER AND STORAGE DEVICES

Thomas P. Rona, Belmont, Mass., assignor to Baird-Atomic, Inc., Cambridge, Mass., a corporation of Massachusetts Filed Oct. 1, 1957, Ser. No. 687,433

19 Claims. (Cl. 340—174.1)

The present invention relates to the transfer and storage of information and, more particularly, to devices comprising novel multi-dimensional storage units for recording information on a so-called "transfer medium" to which a physical change may be imparted by an applied signal and from which a similar signal may be recovered by the effect of such a physical change. The present invention contemplates the use of a variety of such transfer media, for example, a magnetic material in which information is stored as residual magnetization or an electrostatic medium in which information is stored as residual charge.

The object of the present invention is to provide an exceptionally compact and versatile information storage unit which is capable of large storage capacity, short access time and flexible function generation by virtue of a transversely scanned toroidal storage surface. More specifically, this storage unit comprises at least one toroidal storage surface disposed for rotation about its axis of revolution and at least one transducer disposed for rotation in a circular scanning path, the storage surface being dimensioned to provide, in contiguity with an arc of the circular scanning path, a circular arc having a directional component that is transverse relative to the cyclic direction of the storage surface.

Other objects of the invention will in part be obvious and will in part appear hereinafter.

The invention accordingly comprises the apparatus possessing the construction, combination of elements and arrangement of parts which are exemplified in the following detailed disclosure, and the scope of which will be indicated in the appended claims.

For a fuller understanding of the nature and objects of the invention, reference should be had to the following detailed description, taken in connection with the accompanying drawings wherein:

Figure 1 is a front elevation of an information transfer and storage device embodying the present invention;

Fig. 1*a* is a representative showing of a head.

Figures 1, 1A, 2, 3:
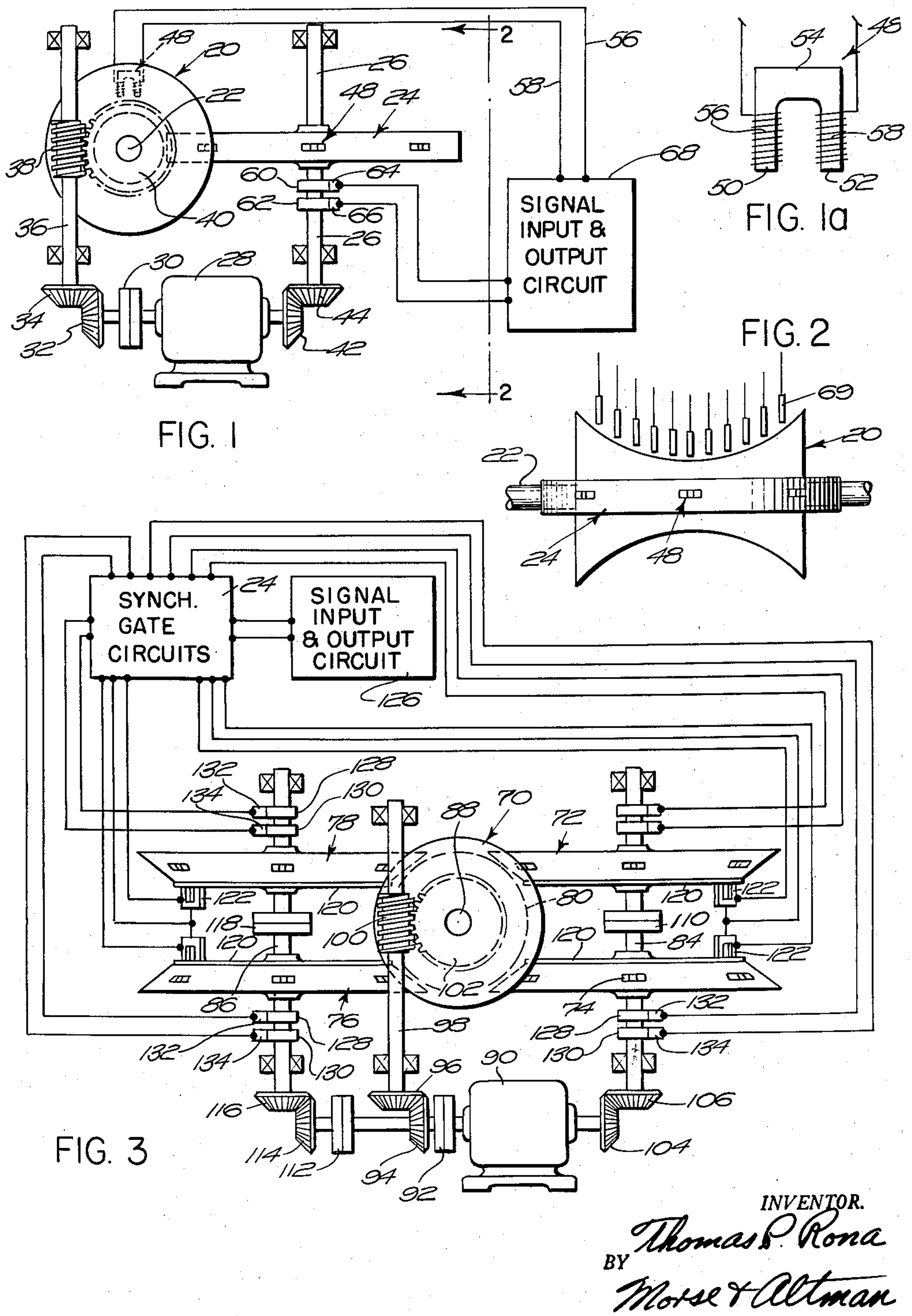
Fig. 2 is a broken-away side elevation of the device of Fig. 1.
Fig. 3 is an elevation of another embodiment of the present invention.

Generally each of the embodiments of the present invention herein illustrated comprises: one or more rotatable drum or disc components, each of which provides a toroidal surface disposed radially about what may be termed a "recording axis," and coated with a magnetic medium; and one or more electromagnetic transducers or transfer heads carried by one or more rotatable discs, each rotatable substantially in a plane normal to what may be termed a "scanning axis." The magnetic medium may be composed, for example, of powdered iron oxide dispersed in a suitable synthetic organic polymer. The transducer is in the form, for example, of a minute iron horseshoe having windings capable of producing magnetic induction in its legs in one direction or the other according to the current direction. A pulse applied to these windings produces a predetermined magnetic state in the portion of the magnetic medium located across the transducer gap at the instant when the pulse occurs. Conversely, a pulse is generated in these windings by this preset magnetic state when the magnetic medium and the transducer are rotated relative to one another. In the drawings, the residual magnetism of the storage medium produced by a transducer when subjected to a signal representing the binary digit "1" is indicated by a dot. The residual magnetism or the absence thereof produced when the transfer head is subjected to a signal representing the binary digit "0" is indicated by the absence of a dot. In conventional fashion, the absence of a dot may indicate that an alternating current erase pulse has been applied. In each of the disclosed devices, the magnetic surface may be employed either for storage when containing no initial record or for function generation when containing an initial record of predetermined character. In general, a wide variety of magnetic and electrostatic recording techniques, known in connection with stationary transducer recording, may be used in the herein disclosed embodiments. Specifically applicable to the herein disclosed embodiments are: zero-return digital recording and reading; and phase-coincidence digital recording and reading.

In accordance with the present invention, the toroidal storage surface is formed either on the periphery or on a face or faces of the drum or disc about whose axis it rotates, this axis, as indicated above, being termed the "recording axis." The scanning disc is disposed in a plane which alternatively includes the recording axis, is parallel to the recording axis, or is oblique to the recording axis, depending upon design requirements. In every case, the cross section of the toroidal surface in the plane of the drum or disc axis is a conic or, more generally, a quadratic curve. When the plane of the scanning disc contains the recording axis, the toroidal cross section is a portion of a circle. When the plane of the scanning disc is parallel to the recording axis, the toroidal cross section is a hyperbola. When the plane of the scanning disc is oblique with respect to the recording axis, the toroidal cross section is an ellipse. The construction in each case is such that the scanning transducer is radially disposed for rotation in a circular path that is contiguous with a circular path on the storage surface (assumed to be stationary). This circular path has a directional component that is transverse relative to the cyclic direction of the storage surface and has a radius that is substantially the same as the radius of the circular scanning path. In other words the plane of the scanning path approximately intersects the toroidal surface in the arc of a circle at the center of which is the center of the scanning path.

In each of the disclosed devices, if the rotational speeds of the toroidal surface and the scanning disc are multiples of a common number, i.e., are either the same or are different but with a common denominator, transducers on the scanning disc will repeatedly scan predetermined lines across the toroidal surface. On the other hand, if the rotational speeds of the toroidal surface and the scanning disc are proportional to selected prime numbers, transducers on the scanning disc will read successive lines during successive revolutions.

The transfer and storage device of Fig. 1 comprises a toroidal drum 20 journaled for rotation on a shaft 22, and a scanning disc 24, journaled for rotation on a shaft 26. A motor 28 drives drum 20 through an adjustable coupling 30, a pair of bevel gears 32 and 34, a shaft 36, a worm 38 and a wormwheel 40, which is keyed to shaft 22. Motor 28 drives scanning disc 24 through a pair of bevel gears 42 and 44 and shaft 26. Drum 20 presents a peripheral toroidal surface. A plurality of transducers 48 are disposed at intervals along the periphery of scanning disc 24. Each of transducers 48, as shown in Fig. 1*a*, is in the form of an electromagnet having a pair of legs 50 and 52 and a bight 54, composed of soft iron, and a pair of windings 56 and 58 about legs 50 and 52, respectively.

The axis of shaft 26 is perpendicular to the axis of the shaft 22 and equidistant from the center of toroidal surface. Thus toroidal surface 46 has a circular cross-sectional profile, the radius of which is substantially equal to the radius of scanning disc 24, the outer extremities of legs 50 and 52 being spaced from toroidal surface 20 by a distance of the order of one thousandth of an inch. Also keyed to shaft 26 are a pair of slip rings 60 and 62, which are electrically connected to the terminals of windings 56 and 58, respectively, of each transducer 48. Suitable signal input and output circuits, generally designated by 68, apply signals to or are energized by signals from slip rings 60 and 62 through a pair of brushes 64 and 66.

In operation, coupling 30 is adjusted in order to synchronize the rotational speeds of storage element 20 and scanning disc 24. Thereafter, in one form of the device, input pulses from circuit 68 are applied through brushes 64 and 66 and slip rings 60 and 62 by transducers 48 to produce a storage record in the form of recoverable magnetized states of localized toroidal areas. In another form of the device, localized toroidal areas possess prerecorded magnetized states for the purpose of generating pulses in transducers 48 for transmission through slip rings 60 and 62 and brushes 64 and 66 to circuits 68.

Although, in general, the present invention contemplates that both the toroidal surface and the scanning discs be driven at predetermined angular velocities throughout recurrent rotational cycles, parallel input to serial output or serial input to parallel output may be achieved, as illustrated in the embodiment of Figs. 1 and 2. As best shown in Fig. 2, parallel information recorded through a plurality of stationary track transducers 69 can be recovered in any desired series output combination through the agency of circular scan transducer 48. Conversely, serial information recorded through circular scan transducer 48 may be recovered in any desired parallel output combination through the agency of stationary track transducers 69.

Fig. 3 illustrates a toroidal drum 70 and four associated scanning discs 72, 74, 76 and 78. The annular periphery 80 of drum 70 is coated with a magnetic medium of the type described above. Each of the discs is provided, at spaced intervals along its annular periphery, with transducers 74 of the type described above. Scanning discs 72 and 74 are centrally keyed to a rotatable shaft 84. Scanning discs 76 and 78 are centrally keyed to a rotatable shaft 86. Toroidal drum 70 is keyed to a rotatable shaft 88. It will be observed that the planes of the scanning discs are parallel to the axis of shaft 88. In order that toroidal surface 80 present circular arcs centered at the axes of shafts 84 and 86, the profile of toroidal surface 80, in the plane of the axis of shaft 88, is defined, within machining tolerances as generated by the cross section of the toroidal surface and the scanning plane.

As illustrated, toroidal drum 70 and discs 72, 74, 76 and 78 all are driven by a single motor 90. Toroidal drum 70 is driven through an adjustable coupling 92, a pair of bevel gears 94 and 96, a shaft 98, a worm 100 and a wormwheel 102, which is keyed to shaft 88. Discs 72 and 74 are driven through a pair of bevel gears 104 and 106 and shaft 84, which is interrupted between the discs by an adjustable coupling 110. Discs 76 and 78 are driven through an adjustable coupling 112, a pair of bevel gears 114 and 116, and shaft 86 which is interrupted between the discs by an adjustable coupling 118.

In the illustrated embodiment, electronic synchronization is employed in the following manner. On the inner face of each disc is an annular ring 120 upon which synchronizing signals are recorded. Associated with each of rings 120 is a transducer 122 operatively connected to a gate circuit 124. All signals to or from appropriate signal input and output circuits 126, are controlled by gate circuit 124. As in the case of the device of Fig. 1, each of transducers 82 receives signals from or transmits signals to gate circuit 124 through a pair of slip rings 128 and 130, which are associated with a pair of brushes 132 and 134, respectively.

In operation, adjustable couplings 92, 110, 112 and 118 determine the phase and speed relationships among drum 70 and discs 72, 74, 76 and 78 and gate circuits 124 precisely control the production of incremental records on toroidal surface 80.

Figures 4, 5:
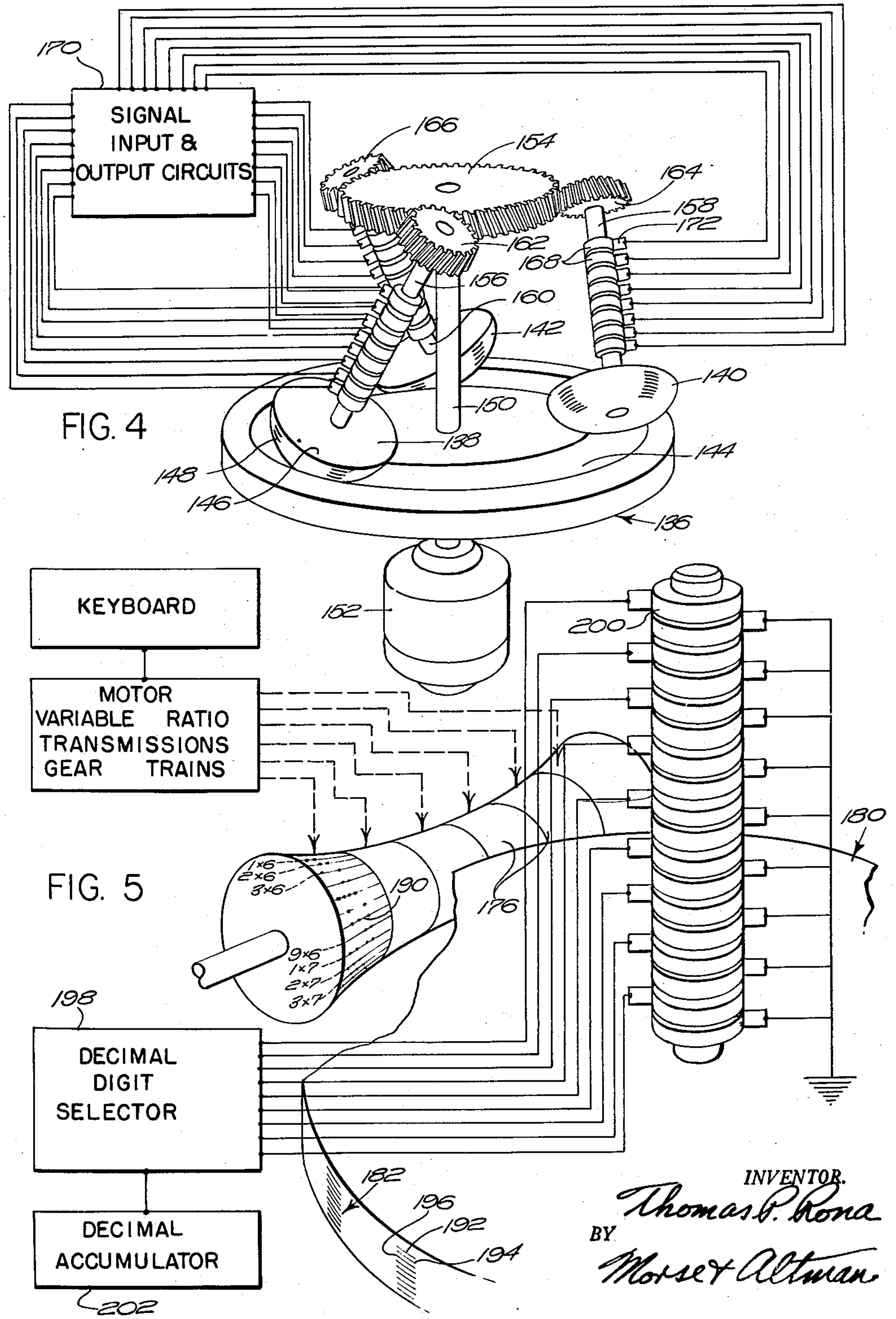
Fig. 4 is a perspective view of a further embodiment of the present invention.
Fig. 5 is a partially sectional view of still another embodiment of the present invention.

Fig. 4 illustrates another embodiment of the present invention comprising a recording disc 136 and three scanning discs 138, 140 and 142. The upper face of disc 136 is provided with a toroidal groove 144 coated with a magnetic material of the above described type. Each of discs 138, 140 and 142 is provided at its periphery with a plurality of stacks 146 of transducers 148, of the above described type.

It will be noted that the plane of rotation of each of transducers 148 intersects the axis of rotation of disc 136. In order that the circular scanning path of each transducer 148 lie in a plane that intersects toroidal surface 144 in the arc of a circle contiguous with the scanning path, toroidal surface 144, in the plane of the axis of disc 136, has an elliptical profile. In accordance with the present invention, when the number of transducers in a stack is relatively great, they may be arranged along the arc of a conic section corresponding to the conic section of the storage surface they scan. Here, transducers 146 of stack 148 are disposed along surfaces which are elliptical in profile in a plane through the axis of the scanning disc.

As shown, storage disc 136 is centrally keyed to a shaft 150, the lower end of which is driven by a motor 152 and the upper end of which carries a spiral bevel gear 154. Discs 138, 140 and 142 are keyed, respectively, to shafts 156, 158 and 160, at the upper ends of which, respectively, are spiral bevel pinions 162, 164 and 166, meshing with spiral bevel gear 154. Thus storage disc 136 and scanning discs 138, 140 and 142 all are driven by single motor 152. As shown, each of shafts 156, 158 and 160 is provided with a plurality of slip rings 168, each electrically connected to the transducers 148 disposed in a common scanning plane. Signals to and from slip rings 168 are transmitted through associated brushes 170 to suitable signal input and output circuits 172 in conventional fashion, one of rings 168 serving as a common ground for one terminal of each transducer.

An alternative embodiment of the present invention, useful for example in the generation of composite functions, is illustrated in Fig. 5. This embodiment comprises a drum 174 that includes a plurality of segments 176, which present increments of a peripheral toroidal surface. Associated with this toroidal surface is a disc 180, the periphery of which is provided at intervals with stacks 182 of transducers of the above described type. Segments 176 are driven independently, as indicated at 186, by a motor through a plurality of independently adjustable infinitely variable transmissions and a plurality of independently adjustable gear trains. Through these clutches and gear trains, the relative speeds of rotation and the relative angular positions of segments 176 may be controlled by a keyboard 188 for the purpose of generating a variety of composite functions. When a button on keyboard 188 is actuated, a specific number of any digital order will place and hold the segment corresponding to that digital order in the angular position corresponding to that number. Each segment may carry a variety of pre-recorded progressive multiples and/or arbitrary functions at different positions. A transducer 184 will read whatever number has been pre-recorded on that segment at a particular angular position. The selection among these multiples and/or functions may be effected by electronic switching of transducers stacked in the axial direction of scanning disc 180. In the illustrated form of this embodiment, the variable ratio transmissions may be omitted, it being necessary only that the relative angular positions of segments 176 be adjustable in response to keyboard 188.

Here, on the periphery of each of segments 176 is pre-recorded the multiplication table from "1×1" to "9×9" in such a way that the multiples of succeeding digits, as indicated on the transverse lines 190 in straight binary notation, follow each other in sequence around the periphery. Each stack 182 includes nine transducers designed to read, respectively, the nine multiples of a given digit on any selected portion of any segment 176. Thus, for example: transducer 192 reads "6"; transducer 194 reads "2×6"; transducer 196 reads "3×6"; etc. By gating a selected transducer corresponding to an appropriate multiplier, it is apparent that truly decimal multiplication can be performed.

In general, the multiplicand, $$A=a_0+a_1 10+a_2 10^2+ \ldots a_n 10^n$$

where: $a$ is a digit selected on a toroidal segment represented by the subscript; and $n$ is the number of toroidal segments.

In general, the multiplier, $$B=b_0+b_1 10+b_2 10^2+ \ldots b_n 10^n$$

where: $b$ is a digit represented by a selected transducer of a stack represented by the subscript; and $n$ is the number of stacks.

The transducer switching, as shown, is effected by a suitable decimal digit selector 198, which is connected individually to corresponding transducers of the various stacks through slip rings 200 in order to operate a suitable decimal accumulator 202.

Figure 6:
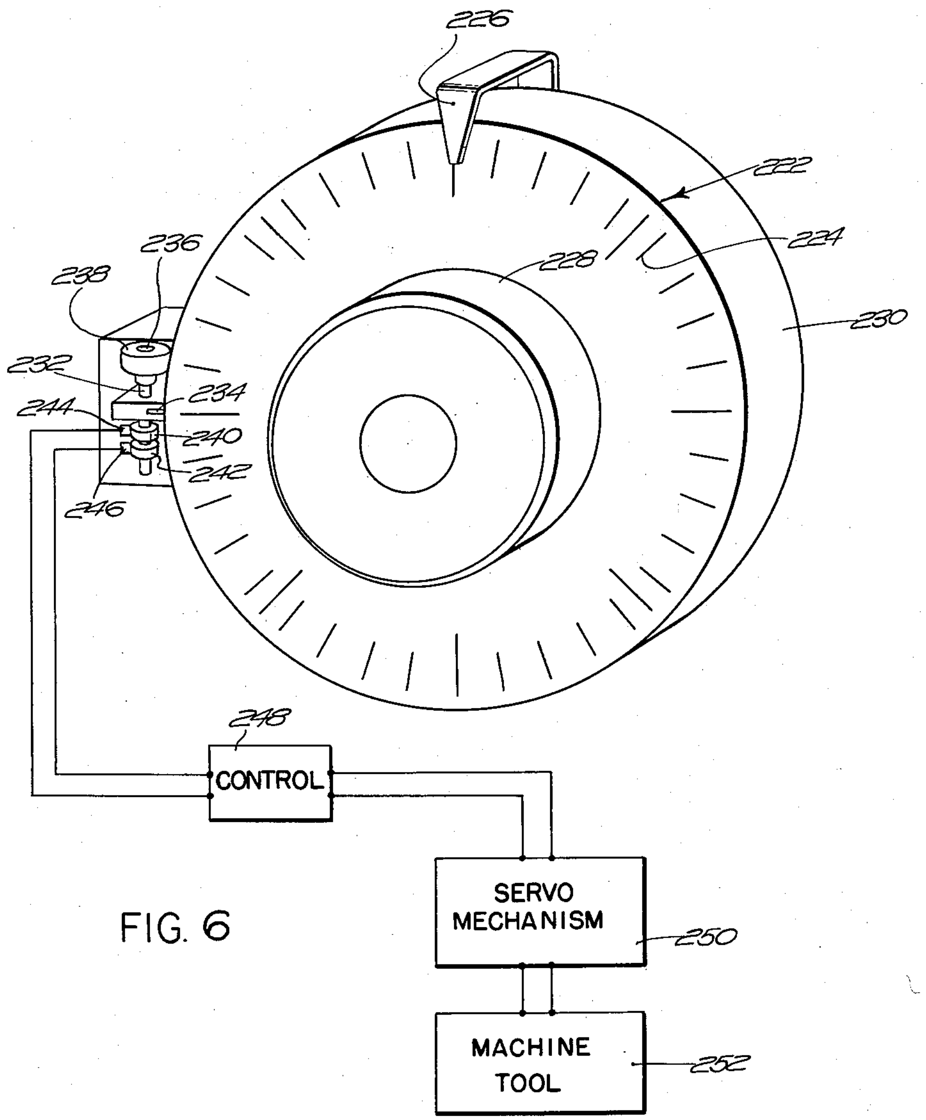
Fig. 6 is a plan view, partially broken away, of still a further embodiment of the present invention.

Fig. 6 illustrates an application of the present invention to machine tool automation. The device of Fig. 6 comprises a manually adjustable dial 222, the front face of which is provided with suitable graduations 224 rotatable relative to a suitable indicator 226 by a manually adjustable knob 228. The periphery 230 of dial 222 is provided with a toroidal surface 230 that is coated with a pre-recorded magnetic or electric medium of the above described type. Associated with toroidal surface 230 is a small scanning disc 232 having a plurality of peripherally arranged transducers 234. Scanning disc 234 is keyed to a shaft 236, which is driven by a motor 238 and which is provided with a pair of slip rings 240 and 242 that are associated with a pair of brushes 244 and 246. Signals from the transducers on scanning disc 232 are transmitted through slip rings 240 and 242 and brushes 244 and 246 to a control circuit 248 and a servo-mechanism 250, which automatically directs the operation of a machine tool 252.

The present invention thus makes possible a variety of novel information handling techniques utilizing toroidal surfaces, which are capable of compact construction, large storage capacity, short access time and flexible function generation. Although each of the foregoing embodiments has incorporated, by way of illustration, toroidal surfaces that are outwardly concave, it is to be understood that toroidal surfaces that are outwardly convex also are contemplated by the present invention. Specifically in each of the embodiments of Fig. 1 through Fig. 5, the magnetic transfer medium and the transducers may be interchanged. For example, in a modification of the embodiment of Fig. 3, the peripheries of discs 138, 140 and 142 are coated with a magnetic medium, and transducers are distributed along the surface of toroidal groove 144.

Since certain changes may be made in the above devices without departing from the scope of the invention herein involved, it is intended that all matter contained in the above description and shown in the accompanying drawings shall be interpreted in an illustrative and not in a limiting sense.

What is claimed is:

1. An information handling device comprising toroidal storage means radially disposed for rotation, transducer means radially disposed for rotation in a circular scanning path, and drive means for continuously rotating said toroidal storage means and said transducer means said storage means being dimensioned to provide, in contiguity with an arc of said circular scanning path, a circular arc having a directional component that is transverse relative to the rotatory direction of said storage surface.

2. An information transfer device comprising toroidal storage means radially disposed for rotation about a storage axis transducer means disposed for rotation in a circular scanning path, drive means for continuously rotating said toroidal storage means and said transducer means said storage means being composed of a medium capable of undergoing a physical change in response to a signal from said transducer and capable of generating a similar signal in said transducer in response to said physical change, said storage means being dimensioned to provide, in contiguity with an arc of said circular scanning path, a circular arc having a directional component that is transverse relative to the rotatory direction of said storage means and digital means operatively connected to said transducer means.

3. The information transfer device of claim 2, wherein said circular scanning path lies in a plane that includes said storage axis and said toroidal storage means is circular in profile.

4. The information transfer device of claim 2, wherein said circular scanning path lies in a plane that is parallel to said storage axis and said toroidal storage means is hyperbolic in profile.

5. The information transfer device of claim 2, wherein said circular scanning path lies in a plane that is oblique to said scanning axis and said toroidal storage means is ellipsoidal in profile.

6. The information transfer device of claim 2, wherein said toroidal storage means is disposed on one of the parallel faces of a cylinder.

7. The information transfer device of claim 2, wherein said toroidal storage means is disposed along the periphery of a cylinder.

8. An information transfer device comprising toroidal storage means radially disposed for axial rotation and transducer means radially disposed for circular scanning rotation, said storage surface being composed of a medium capable of undergoing a physical change in response to a signal from said transducer and capable of generating a similar signal in said transducer in response to said physical change, said storage means and said circular scanning rotation defining contiguous circular arcs having directional components transverse relative to the rotatory direction of said storage means and means for continuously rotating said storage means and said transducer means.

9. The information transfer device of claim 8 wherein said storage means is disposed on the surface of a trough on the face of a cylindrical member.

10. The information transfer device of claim 8 wherein said storage means is disposed along the peripheral edge of a cylindrical member.

11. The information transfer device of claim 8 wherein said transducer means includes a plurality of transducers disposed for rotation in circular scanning paths in different planes.

12. An information transfer device comprising toroidal storage means radially disposed for axial rotation, transducer means radially disposed for circular scanning rotation, and electronic means for transmitting signals to and receiving signals from said transducer means, said storage means including a magnetic medium, said magnetic medium being capable of undergoing a magnetic change in response to an electrical signal applied to said transducer means by said electronic means, said magnetic medium being capable of generating a signal in said transducer means for transmission to said electronic means, said storage means and said circular scanning rotation defining contiguous circular arcs having directional components transverse relative to the rotary direction of said storage means and means for continuously rotating said storage means and said transducer means.

13. The information transfer device of claim 12 wherein said transducer means include a plurality of transducers rotatable in circular scanning paths lying in different planes, said planes being parallel to the axis of said storage means.

14. The information transfer device of claim 12 wherein said transducer means include a plurality of transducers rotatable in circular scanning paths lying in different planes, said planes being oblique with respect to the axis of said storage means.

15. The information transfer device of claim 12 wherein said storage means includes a plurality of rotatable sections providing sections of a toroidal surface, said sections of said toroidal surface being rotatable relative to one another.

16. The information transfer device of claim 12 wherein said toroidal storage means is at the periphery of a rotatable knob, said knob having graduations on its face.

17. An information transfer device comprising toroidal storage means radially disposed for axial rotation on first shaft means, transducer means radially disposed for circular scanning rotation on second shaft means and electronic means for transmitting signals to and receiving signals from said transducer means, said storage means including a magnetic medium, said magnetic medium being capable of undergoing a magnetic change in response to an electrical signal applied to said transducer means by said electronic system, said magnetic medium being capable of generating a signal in said transducer means for transmission to said electronic means, said storage means and said circular scanning rotation defining contiguous circular arcs having directional components transverse relative to the rotary direction of said storage means, said signals being transmitted between said transducer means and said electronic means through slip rings on said second shaft means, and means for continuously rotating said storage means and said transducer means.

18. The information transfer device of claim 17 wherein predetermined records of information extend along said toroidal storage means along said circular arcs for function generation.

19. The information transfer device of claim 17 wherein rotation of said storage means and said transducer means can be halted alternatively.

References Cited in the file of this patent

UNITED STATES PATENTS

| | | |
|---|---|---|
| 2,751,274 | Andrews | June 19, 1956 |
| 2,813,924 | Coutant | Nov. 19, 1957 |
| 2,825,043 | Abbott | Feb. 25, 1958 |